(12) United States Patent
Bachar

(10) Patent No.: US 11,640,047 B2
(45) Date of Patent: May 2, 2023

(54) FOLDED CAMERA WITH OPTICAL IMAGE STABILIZATION

(71) Applicant: Corephotonics Ltd., Tel-Aviv (IL)

(72) Inventor: Gil Bachar, Tel-Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 22 days.

(21) Appl. No.: 16/468,491

(22) PCT Filed: Jan. 3, 2019

(86) PCT No.: PCT/IB2019/050059
§ 371 (c)(1),
(2) Date: Jun. 11, 2019

(87) PCT Pub. No.: WO2019/155289
PCT Pub. Date: Aug. 15, 2019

(65) Prior Publication Data
US 2020/0400926 A1    Dec. 24, 2020

Related U.S. Application Data

(60) Provisional application No. 62/629,298, filed on Feb. 12, 2018.

(51) Int. Cl.
*G02B 13/00* (2006.01)
*G02B 7/04* (2021.01)
(Continued)

(52) U.S. Cl.
CPC ........... *G02B 13/0065* (2013.01); *G02B 7/04* (2013.01); *G02B 27/646* (2013.01); *G03B 5/00* (2013.01);
(Continued)

(58) Field of Classification Search
CPC .... G02B 13/0065; G02B 13/007; G02B 7/02; G02B 7/023; G02B 7/04; G02B 7/08;
(Continued)

(56) References Cited

U.S. PATENT DOCUMENTS

| 4,199,785 A | 4/1980 | McCullough et al. |
| 5,005,083 A | 4/1991 | Grage et al. |

(Continued)

OTHER PUBLICATIONS

Statistical Modeling and Performance Characterization of a Real-Time Dual Camera Surveillance System, Greienhagen et al., Publisher: IEEE, 2000, 8 pages.

(Continued)

*Primary Examiner* — Marin Pichler
(74) *Attorney, Agent, or Firm* — Nathan & Associates; Menachem Nathan

(57) ABSTRACT

Folded digital camera comprising a lens having a lens optical axis, an image sensor and first and second optical path folding elements (OPFEs), in which the second OPFE is closest to the image sensor, wherein the lens is operative to move in a first direction substantially parallel to the lens optical axis and in a second direction substantially perpendicular to first and second optical paths, wherein the second OPFE is operative to move in the first direction, and wherein the combined motion of the lens and of the second OPFE is operative to provide focus and to compensate for tilts of the camera around the first and second directions.

3 Claims, 5 Drawing Sheets

(51) Int. Cl.
*G02B 27/64* (2006.01)
*G03B 5/00* (2021.01)
*G03B 13/32* (2021.01)
*H04N 5/232* (2006.01)
*H04N 5/225* (2006.01)

(52) U.S. Cl.
CPC ........... *G03B 13/32* (2013.01); *H04N 5/2254* (2013.01); *H04N 5/23287* (2013.01); *G03B 2205/003* (2013.01)

(58) Field of Classification Search
CPC ... G02B 7/09; G02B 7/10; G02B 7/18; G02B 7/1805; G02B 7/182; G02B 27/64; G02B 27/646; G03B 5/00; G03B 5/02; G03B 5/04; G03B 5/32; G03B 5/34; G03B 5/36; G03B 2205/00; G03B 2205/0007; G03B 2205/0015; G03B 2205/003; G03B 2205/0046; G03B 2205/0053; G03B 2205/0061; G03B 2205/0069; H04N 5/2254; H04N 5/23287; H04N 5/2328; H04N 5/2326
USPC ................ 359/359, 555, 556, 557, 813, 814
See application file for complete search history.

(56) References Cited

U.S. PATENT DOCUMENTS

| | | |
|---|---|---|
| 5,032,917 A | 7/1991 | Aschwanden |
| 5,041,852 A | 8/1991 | Misawa et al. |
| 5,051,830 A | 9/1991 | von Hoessle |
| 5,099,263 A | 3/1992 | Matsumoto et al. |
| 5,248,971 A | 9/1993 | Mandl |
| 5,287,093 A | 2/1994 | Amano et al. |
| 5,394,520 A | 2/1995 | Hall |
| 5,436,660 A | 7/1995 | Sakamoto |
| 5,444,478 A | 8/1995 | Lelong et al. |
| 5,459,520 A | 10/1995 | Sasaki |
| 5,657,402 A | 8/1997 | Bender et al. |
| 5,682,198 A | 10/1997 | Katayama et al. |
| 5,768,443 A | 6/1998 | Michael et al. |
| 5,926,190 A | 7/1999 | Turkowski et al. |
| 5,940,641 A | 8/1999 | McIntyre et al. |
| 5,982,951 A | 11/1999 | Katayama et al. |
| 6,101,334 A | 8/2000 | Fantone |
| 6,128,416 A | 10/2000 | Oura |
| 6,148,120 A | 11/2000 | Sussman |
| 6,208,765 B1 | 3/2001 | Bergen |
| 6,268,611 B1 | 7/2001 | Pettersson et al. |
| 6,549,215 B2 | 4/2003 | Jouppi |
| 6,611,289 B1 | 8/2003 | Yu et al. |
| 6,643,416 B1 | 11/2003 | Daniels et al. |
| 6,650,368 B1 | 11/2003 | Doron |
| 6,680,748 B1 | 1/2004 | Monti |
| 6,714,665 B1 | 3/2004 | Hanna et al. |
| 6,724,421 B1 | 4/2004 | Glatt |
| 6,738,073 B2 | 5/2004 | Park et al. |
| 6,741,250 B1 | 5/2004 | Furlan et al. |
| 6,750,903 B1 | 6/2004 | Miyatake et al. |
| 6,778,207 B1 | 8/2004 | Lee et al. |
| 7,002,583 B2 | 2/2006 | Rabb, III |
| 7,015,954 B1 | 3/2006 | Foote et al. |
| 7,038,716 B2 | 5/2006 | Klein et al. |
| 7,199,348 B2 | 4/2007 | Olsen et al. |
| 7,206,136 B2 | 4/2007 | Labaziewicz et al. |
| 7,248,294 B2 | 7/2007 | Slatter |
| 7,256,944 B2 | 8/2007 | Labaziewicz et al. |
| 7,305,180 B2 | 12/2007 | Labaziewicz et al. |
| 7,339,621 B2 | 3/2008 | Fortier |
| 7,346,217 B1 | 3/2008 | Gold, Jr. |
| 7,365,793 B2 | 4/2008 | Cheatle et al. |
| 7,411,610 B2 | 8/2008 | Doyle |
| 7,424,218 B2 | 9/2008 | Baudisch et al. |
| 7,509,041 B2 | 3/2009 | Hosono |
| 7,533,819 B2 | 5/2009 | Barkan et al. |
| 7,619,683 B2 | 11/2009 | Davis |
| 7,738,016 B2 | 6/2010 | Toyofuku |
| 7,773,121 B1 | 8/2010 | Huntsberger et al. |
| 7,809,256 B2 | 10/2010 | Kuroda et al. |
| 7,880,776 B2 | 2/2011 | LeGall et al. |
| 7,918,398 B2 | 4/2011 | Li et al. |
| 7,964,835 B2 | 6/2011 | Olsen et al. |
| 7,978,239 B2 | 7/2011 | Deever et al. |
| 8,115,825 B2 | 2/2012 | Culbert et al. |
| 8,149,327 B2 | 4/2012 | Lin et al. |
| 8,154,610 B2 | 4/2012 | Jo et al. |
| 8,238,695 B1 | 8/2012 | Davey et al. |
| 8,274,552 B2 | 9/2012 | Dahi et al. |
| 8,390,729 B2 | 3/2013 | Long et al. |
| 8,391,697 B2 | 3/2013 | Cho et al. |
| 8,400,555 B1 | 3/2013 | Georgiev et al. |
| 8,439,265 B2 | 5/2013 | Ferren et al. |
| 8,446,484 B2 | 5/2013 | Muukki et al. |
| 8,483,452 B2 | 7/2013 | Ueda et al. |
| 8,514,491 B2 | 8/2013 | Duparre |
| 8,547,389 B2 | 10/2013 | Hoppe et al. |
| 8,553,106 B2 | 10/2013 | Scarff |
| 8,587,691 B2 | 11/2013 | Takane |
| 8,619,148 B1 | 12/2013 | Watts et al. |
| 8,803,990 B2 | 8/2014 | Smith |
| 8,896,655 B2 | 11/2014 | Mauchly et al. |
| 8,976,255 B2 | 3/2015 | Matsuoto et al. |
| 9,019,387 B2 | 4/2015 | Nakano |
| 9,025,073 B2 | 5/2015 | Attar et al. |
| 9,025,077 B2 | 5/2015 | Attar et al. |
| 9,041,835 B2 | 5/2015 | Honda |
| 9,137,447 B2 | 9/2015 | Shibuno |
| 9,185,291 B1 | 11/2015 | Shabtay et al. |
| 9,215,377 B2 | 12/2015 | Sokeila et al. |
| 9,215,385 B2 | 12/2015 | Luo |
| 9,270,875 B2 | 2/2016 | Brisedoux et al. |
| 9,286,680 B1 | 3/2016 | Jiang et al. |
| 9,344,626 B2 | 5/2016 | Silverstein et al. |
| 9,360,671 B1 | 6/2016 | Zhou |
| 9,369,621 B2 | 6/2016 | Malone et al. |
| 9,413,930 B2 | 8/2016 | Geerds |
| 9,413,984 B2 | 8/2016 | Attar et al. |
| 9,420,180 B2 | 8/2016 | Jin |
| 9,438,792 B2 | 9/2016 | Nakada et al. |
| 9,485,432 B1 | 11/2016 | Medasani et al. |
| 9,578,257 B2 | 2/2017 | Attar et al. |
| 9,618,748 B2 | 4/2017 | Munger et al. |
| 9,681,057 B2 | 6/2017 | Attar et al. |
| 9,723,220 B2 | 8/2017 | Sugie |
| 9,736,365 B2 | 8/2017 | Laroia |
| 9,736,391 B2 | 8/2017 | Du et al. |
| 9,768,310 B2 | 9/2017 | Ahn et al. |
| 9,800,798 B2 | 10/2017 | Ravirala et al. |
| 9,851,803 B2 | 12/2017 | Fisher et al. |
| 9,894,287 B2 | 2/2018 | Qian et al. |
| 9,900,522 B2 | 2/2018 | Lu |
| 9,927,600 B2 | 3/2018 | Goldenberg et al. |
| 2002/0005902 A1 | 1/2002 | Yuen |
| 2002/0030163 A1 | 3/2002 | Zhang |
| 2002/0063711 A1 | 5/2002 | Park et al. |
| 2002/0075258 A1 | 6/2002 | Park et al. |
| 2002/0122113 A1 | 9/2002 | Foote |
| 2002/0167741 A1 | 11/2002 | Koiwai et al. |
| 2003/0030729 A1 | 2/2003 | Prentice et al. |
| 2003/0093805 A1 | 5/2003 | Gin |
| 2003/0160886 A1 | 8/2003 | Misawa et al. |
| 2003/0202113 A1 | 10/2003 | Yoshikawa |
| 2004/0008773 A1 | 1/2004 | Itokawa |
| 2004/0012683 A1 | 1/2004 | Yamasaki et al. |
| 2004/0017386 A1 | 1/2004 | Liu et al. |
| 2004/0027367 A1 | 2/2004 | Pilu |
| 2004/0061788 A1 | 4/2004 | Bateman |
| 2004/0141065 A1 | 7/2004 | Hara et al. |
| 2004/0141086 A1 | 7/2004 | Mihara |
| 2004/0240052 A1 | 12/2004 | Minefuji et al. |
| 2005/0013509 A1 | 1/2005 | Samadani |
| 2005/0046740 A1 | 3/2005 | Davis |
| 2005/0157184 A1 | 7/2005 | Nakanishi et al. |

(56) References Cited

U.S. PATENT DOCUMENTS

| | | |
|---|---|---|
| 2005/0168834 A1 | 8/2005 | Matsumoto et al. |
| 2005/0185049 A1 | 8/2005 | Iwai et al. |
| 2005/0200718 A1 | 9/2005 | Lee |
| 2006/0054782 A1 | 3/2006 | Olsen et al. |
| 2006/0056056 A1 | 3/2006 | Ahiska et al. |
| 2006/0067672 A1 | 3/2006 | Washisu et al. |
| 2006/0102907 A1 | 5/2006 | Lee et al. |
| 2006/0125937 A1 | 6/2006 | LeGall et al. |
| 2006/0170793 A1 | 8/2006 | Pasquarette et al. |
| 2006/0175549 A1 | 8/2006 | Miller et al. |
| 2006/0187310 A1 | 8/2006 | Janson et al. |
| 2006/0187322 A1 | 8/2006 | Janson et al. |
| 2006/0187338 A1 | 8/2006 | May et al. |
| 2006/0227236 A1 | 10/2006 | Pak |
| 2007/0024737 A1 | 2/2007 | Nakamura et al. |
| 2007/0126911 A1* | 6/2007 | Nanjo ............... H04N 5/2254 348/335 |
| 2007/0177025 A1 | 8/2007 | Kopet et al. |
| 2007/0188653 A1 | 8/2007 | Pollock et al. |
| 2007/0189386 A1 | 8/2007 | Imagawa et al. |
| 2007/0257184 A1 | 11/2007 | Olsen et al. |
| 2007/0285550 A1 | 12/2007 | Son |
| 2008/0017557 A1 | 1/2008 | Witdouck |
| 2008/0024614 A1 | 1/2008 | Li et al. |
| 2008/0025634 A1 | 1/2008 | Border et al. |
| 2008/0030592 A1 | 2/2008 | Border et al. |
| 2008/0030611 A1 | 2/2008 | Jenkins |
| 2008/0084484 A1 | 4/2008 | Ochi et al. |
| 2008/0106629 A1 | 5/2008 | Kurtz et al. |
| 2008/0117316 A1 | 5/2008 | Orimoto |
| 2008/0129831 A1 | 6/2008 | Cho et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2009/0086074 A1 | 4/2009 | Li et al. |
| 2009/0109556 A1 | 4/2009 | Shimizu et al. |
| 2009/0122195 A1 | 5/2009 | Van Baar et al. |
| 2009/0122406 A1 | 5/2009 | Rouvinen et al. |
| 2009/0128644 A1 | 5/2009 | Camp et al. |
| 2009/0219547 A1 | 9/2009 | Kauhanen et al. |
| 2009/0252484 A1 | 10/2009 | Hasuda et al. |
| 2009/0295949 A1 | 12/2009 | Ojala |
| 2009/0324135 A1 | 12/2009 | Kondo et al. |
| 2010/0013906 A1 | 1/2010 | Border et al. |
| 2010/0020221 A1 | 1/2010 | Tupman et al. |
| 2010/0060746 A9 | 3/2010 | Olsen et al. |
| 2010/0097444 A1 | 4/2010 | Lablans |
| 2010/0103194 A1 | 4/2010 | Chen et al. |
| 2010/0165131 A1 | 7/2010 | Makimoto et al. |
| 2010/0196001 A1 | 8/2010 | Ryynänen et al. |
| 2010/0238327 A1 | 9/2010 | Griffith et al. |
| 2010/0259836 A1 | 10/2010 | Kang et al. |
| 2010/0283842 A1 | 11/2010 | Guissin et al. |
| 2010/0321494 A1 | 12/2010 | Peterson et al. |
| 2011/0058320 A1 | 3/2011 | Kim et al. |
| 2011/0063417 A1 | 3/2011 | Peters et al. |
| 2011/0063446 A1 | 3/2011 | McMordie et al. |
| 2011/0064327 A1 | 3/2011 | Dagher et al. |
| 2011/0080487 A1 | 4/2011 | Venkataraman et al. |
| 2011/0128288 A1 | 6/2011 | Petrou et al. |
| 2011/0164172 A1 | 7/2011 | Shintani et al. |
| 2011/0229054 A1 | 9/2011 | Weston et al. |
| 2011/0234798 A1 | 9/2011 | Chou |
| 2011/0234853 A1 | 9/2011 | Hayashi et al. |
| 2011/0234881 A1 | 9/2011 | Wakabayashi et al. |
| 2011/0242286 A1 | 10/2011 | Pace et al. |
| 2011/0242355 A1 | 10/2011 | Goma et al. |
| 2011/0298966 A1 | 12/2011 | Kirschstein et al. |
| 2012/0026366 A1 | 2/2012 | Golan et al. |
| 2012/0044372 A1 | 2/2012 | Cote et al. |
| 2012/0062780 A1 | 3/2012 | Morihisa |
| 2012/0069235 A1 | 3/2012 | Imai |
| 2012/0075489 A1 | 3/2012 | Nishihara |
| 2012/0105579 A1 | 5/2012 | Jeon et al. |
| 2012/0124525 A1 | 5/2012 | Kang |
| 2012/0154547 A1 | 6/2012 | Aizawa |
| 2012/0154614 A1 | 6/2012 | Moriya et al. |
| 2012/0196648 A1 | 8/2012 | Havens et al. |
| 2012/0229663 A1 | 9/2012 | Nelson et al. |
| 2012/0249815 A1 | 10/2012 | Bohn et al. |
| 2012/0287315 A1 | 11/2012 | Huang et al. |
| 2012/0320467 A1 | 12/2012 | Baik et al. |
| 2013/0002928 A1 | 1/2013 | Imai |
| 2013/0016427 A1 | 1/2013 | Sugawara |
| 2013/0063629 A1 | 3/2013 | Webster et al. |
| 2013/0076922 A1 | 3/2013 | Shihoh et al. |
| 2013/0093842 A1 | 4/2013 | Yahata |
| 2013/0094126 A1 | 4/2013 | Rappoport et al. |
| 2013/0113894 A1 | 5/2013 | Mirlay |
| 2013/0135445 A1 | 5/2013 | Dahi et al. |
| 2013/0155176 A1 | 6/2013 | Paripally et al. |
| 2013/0182150 A1 | 7/2013 | Asakura |
| 2013/0201360 A1 | 8/2013 | Song |
| 2013/0202273 A1 | 8/2013 | Ouedraogo et al. |
| 2013/0235224 A1 | 9/2013 | Park et al. |
| 2013/0250150 A1 | 9/2013 | Malone et al. |
| 2013/0258044 A1 | 10/2013 | Betts-LaCroix |
| 2013/0270419 A1 | 10/2013 | Singh et al. |
| 2013/0278785 A1 | 10/2013 | Nomura et al. |
| 2013/0321668 A1 | 12/2013 | Kamath |
| 2014/0009631 A1 | 1/2014 | Topliss |
| 2014/0049615 A1 | 2/2014 | Uwagawa |
| 2014/0118584 A1 | 5/2014 | Lee et al. |
| 2014/0192238 A1 | 7/2014 | Attar et al. |
| 2014/0192253 A1 | 7/2014 | Laroia |
| 2014/0218587 A1 | 8/2014 | Shah |
| 2014/0313316 A1 | 10/2014 | Olsson et al. |
| 2014/0362242 A1 | 12/2014 | Takizawa |
| 2015/0002683 A1 | 1/2015 | Hu et al. |
| 2015/0042870 A1 | 2/2015 | Chan et al. |
| 2015/0070781 A1 | 3/2015 | Cheng et al. |
| 2015/0092066 A1 | 4/2015 | Geiss et al. |
| 2015/0103147 A1 | 4/2015 | Ho et al. |
| 2015/0138381 A1 | 5/2015 | Ahn |
| 2015/0154776 A1 | 6/2015 | Zhang et al. |
| 2015/0162048 A1 | 6/2015 | Hirata et al. |
| 2015/0195458 A1 | 7/2015 | Nakayama et al. |
| 2015/0215516 A1 | 7/2015 | Dolgin |
| 2015/0237280 A1 | 8/2015 | Choi et al. |
| 2015/0242994 A1 | 8/2015 | Shen |
| 2015/0244906 A1 | 8/2015 | Wu et al. |
| 2015/0253543 A1 | 9/2015 | Mercado |
| 2015/0253647 A1 | 9/2015 | Mercado |
| 2015/0261299 A1 | 9/2015 | Wajs |
| 2015/0271471 A1 | 9/2015 | Hsieh et al. |
| 2015/0281678 A1 | 10/2015 | Park et al. |
| 2015/0286033 A1 | 10/2015 | Osborne |
| 2015/0316744 A1 | 11/2015 | Chen |
| 2015/0334309 A1 | 11/2015 | Peng et al. |
| 2016/0044250 A1 | 2/2016 | Shabtay et al. |
| 2016/0070088 A1 | 3/2016 | Koguchi |
| 2016/0154202 A1 | 6/2016 | Wippermann et al. |
| 2016/0154204 A1 | 6/2016 | Lim et al. |
| 2016/0212358 A1 | 7/2016 | Shikata |
| 2016/0212418 A1 | 7/2016 | Demirdjian et al. |
| 2016/0241751 A1 | 8/2016 | Park |
| 2016/0291295 A1 | 10/2016 | Shabtay et al. |
| 2016/0295112 A1 | 10/2016 | Georgiev et al. |
| 2016/0301840 A1 | 10/2016 | Du et al. |
| 2016/0353008 A1 | 12/2016 | Osborne |
| 2016/0353012 A1 | 12/2016 | Kao et al. |
| 2017/0019616 A1 | 1/2017 | Zhu et al. |
| 2017/0070731 A1 | 3/2017 | Darling et al. |
| 2017/0187962 A1 | 6/2017 | Lee et al. |
| 2017/0214846 A1 | 7/2017 | Du et al. |
| 2017/0214866 A1 | 7/2017 | Zhu et al. |
| 2017/0242225 A1 | 8/2017 | Fiske |
| 2017/0289458 A1 | 10/2017 | Song et al. |
| 2018/0013944 A1 | 1/2018 | Evans, V et al. |
| 2018/0017844 A1 | 1/2018 | Yu et al. |
| 2018/0024329 A1* | 1/2018 | Goldenberg ....... H04N 5/23258 359/557 |
| 2018/0059379 A1 | 3/2018 | Chou |

(56) References Cited

U.S. PATENT DOCUMENTS

| | | |
|---|---|---|
| 2018/0120674 A1 | 5/2018 | Avivi et al. |
| 2018/0150973 A1 | 5/2018 | Tang et al. |
| 2018/0176426 A1 | 6/2018 | Wei et al. |
| 2018/0198897 A1 | 7/2018 | Tang et al. |
| 2018/0241922 A1 | 8/2018 | Baldwin et al. |
| 2018/0295292 A1 | 10/2018 | Lee et al. |
| 2018/0300901 A1 | 10/2018 | Wakai et al. |
| 2019/0121103 A1 | 4/2019 | Bachar et al. |
| 2020/0264403 A1 | 8/2020 | Bachar et al. |

OTHER PUBLICATIONS

A 3MPixel Multi-Aperture Image Sensor with 0.7μm Pixels in 0.11μm CMOS, Fife et al., Stanford University, 2008, 3 pages.
Dual camera intelligent sensor for high definition 360 degrees surveillance, Scotti et al., Publisher: IET, May 9, 2000, 8 pages.
Dual-sensor foveated imaging system, Hua et al., Publisher: Optical Society of America, Jan. 14, 2008, 11 pages.
Defocus Video Matting, McGuire et al., Publisher: ACM SIGGRAPH, Jul. 31, 2005, 11 pages.
Compact multi-aperture imaging with high angular resolution, Santacana et al., Publisher: Optical Society of America, 2015, 10 pages.
Multi-Aperture Photography, Green et al., Publisher: Mitsubishi Electric Research Laboratories, Inc., Jul. 2007, 10 pages.
Multispectral Bilateral Video Fusion, Bennett et al., Publisher: IEEE, May 2007, 10 pages.
Super-resolution imaging using a camera array, Santacana et al., Publisher: Optical Society of America, 2014, 6 pages.
Optical Splitting Trees for High-Precision Monocular Imaging, McGuire et al., Publisher: IEEE, 2007, 11 pages.
High Performance Imaging Using Large Camera Arrays, Wilburn et al., Publisher: Association for Computing Machinery, Inc., 2005, 12 pages.
Real-time Edge-Aware Image Processing with the Bilateral Grid, Chen et al., Publisher: ACM SIGGRAPH, 2007, 9 pages.
Superimposed multi-resolution imaging, Carles et al., Publisher: Optical Society of America, 2017, 13 pages.
Viewfinder Alignment, Adams et al., Publisher: Eurographics, 2008, 10 pages.
Dual-Camera System for Multi-Level Activity Recognition, Bodor et al., Publisher: IEEE, Oct. 2014, 6 pages.
Engineered to the task: Why camera-phone cameras are different, Giles Humpston, Publisher: Solid State Technology, Jun. 2009, 3 pages.
International Search Report and Written Opinion in related PCT application PCT/IB2019/050059, dated May 31, 2019. 8 pages.
Office action in related EP patent application 19751717.0, dated Dec. 1, 2020.
Office action in related CN patent application 201980006227.8, dated Jan. 26, 2021.

\* cited by examiner

FOLDED CAMERA WITH OPTICAL IMAGE STABILIZATION

CROSS REFERENCE TO RELATED APPLICATIONS

This application is a 371 application from international patent application No. PCT/IB2019/050059 filed Jan. 3, 2019, which claims the benefit of priority from U.S. Provisional patent application No. 62/629,298 filed Feb. 12, 2018, which is incorporated herein by reference in its entirety.

FIELD

Embodiments disclosed herein relate in general to digital cameras and in particular to folded digital cameras and dual folded-upright cameras incorporated in mobile electronic devices such as smartphones.

BACKGROUND

A typical digital camera includes an image sensor (or simply "sensor") and a lens. The lens forms an image on the sensor. A lens module may include several lens elements, typically assembled in one lens barrel. Folded cameras (FCs) and double-folded cameras (DFCs) are known, see for example co-owned international patent application PCT/IB2015/056004. Folded cameras include an additional optical path folding element (OPFE) that folds the light from object to lens. The OPFE may be for example a prism or a mirror. Double-folded cameras include a second OPFE that folds the light from the lens to the image sensor. Such camera may have focus and auto-focus capabilities. FCs with optical image stabilization (OIS) capabilities are also known.

Folded cameras with a "distributed" (or 'split') lens are folded cameras in which one or more of the lens elements is installed in the optical path between an imaged object and the OPFE, while other lens elements are installed in the optical path between the OPFE and the image sensor (see e.g. the Asus ZenFone Zoom).

SUMMARY

In exemplary embodiments, there are provided digital cameras comprising: a lens having a lens optical axis, an image sensor, a first OPFE for folding light arriving from an object in a first optical path to a second optical path substantially aligned with the lens optical axis, and a second OPFE for folding light from the second optical path to a third optical path toward the image sensor, wherein the third optical path is substantially parallel with the first optical path, wherein the first and third optical paths are substantially orthogonal to the second optical path, wherein the lens is operative to move in a first direction substantially parallel to the lens optical axis and in a second direction substantially perpendicular to both the first and second optical paths, wherein the second OPFE is operative to move in the first direction, and wherein the combined motion of the lens and of the second OPFE is operative to provide focus and to compensate for tilts of the camera around the first and second directions. The first and second OPFEs may be prism, mirrors, or a prism and a mirror.

In some embodiments, the lens is fixedly attached to the first OPFE to form a lens-OPFE assembly.

In some embodiments, the lens is a folded lens.

In exemplary embodiments, there are provided methods for providing focus and optical image stabilization in a folded camera module that includes a first OPFE for folding light from a first optical path with a first optical axis to a second optical path with a second optical axis perpendicular to the first optical axis, a lens module carrying a lens with a symmetry axis parallel to the second optical axis, and a second OPFE for folding light from the second optical path to a third optical path, a method comprising moving the lens in a first direction substantially parallel to the lens optical axis and in a second direction substantially perpendicular to both the first and second optical paths, and moving the second OPFE in the first direction, wherein the combined motion of the lens and of the second OPFE is operative to provide focus and to compensate for tilts of the camera around the first and second directions.

BRIEF DESCRIPTION OF THE DRAWINGS

Non-limiting examples of embodiments disclosed herein are described below with reference to figures attached hereto that are listed following this paragraph. Identical structures, elements or parts that appear in more than one figure are generally labeled with a same numeral in all the figures in which they appear. The drawings and descriptions are meant to illuminate and clarify embodiments disclosed herein, and should not be considered limiting in any way. In the drawings.

DETAILED DESCRIPTION

In the following detailed description, numerous specific details are set forth in order to provide a thorough understanding. However, it will be understood by those skilled in the art that the presently disclosed subject matter may be practiced without these specific details. In other instances, well-known methods have not been described in detail so as not to obscure the presently disclosed subject matter.

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination.

The term "processing unit" as disclosed herein should be broadly construed to include any kind of electronic device with data processing circuitry, which includes for example a computer processing device operatively connected to a computer memory (e.g. digital signal processor (DSP), a microcontroller, a field programmable gate array (FPGA), an application specific integrated circuit (ASIC), etc.) capable of executing various data processing operations.

Furthermore, for the sake of clarity the term "substantially" is used herein to imply the possibility of variations in values within an acceptable range. According to one example, the term "substantially" used herein should be interpreted to imply possible variation of up to 10% over or under any specified value. According to another example, the term "substantially" used herein should be interpreted to imply possible variation of up to 5% over or under any specified value. According to a further example, the term "substantially" used herein should be interpreted to imply possible variation of up to 2.5% over or under any specified value.

Figure 1A:
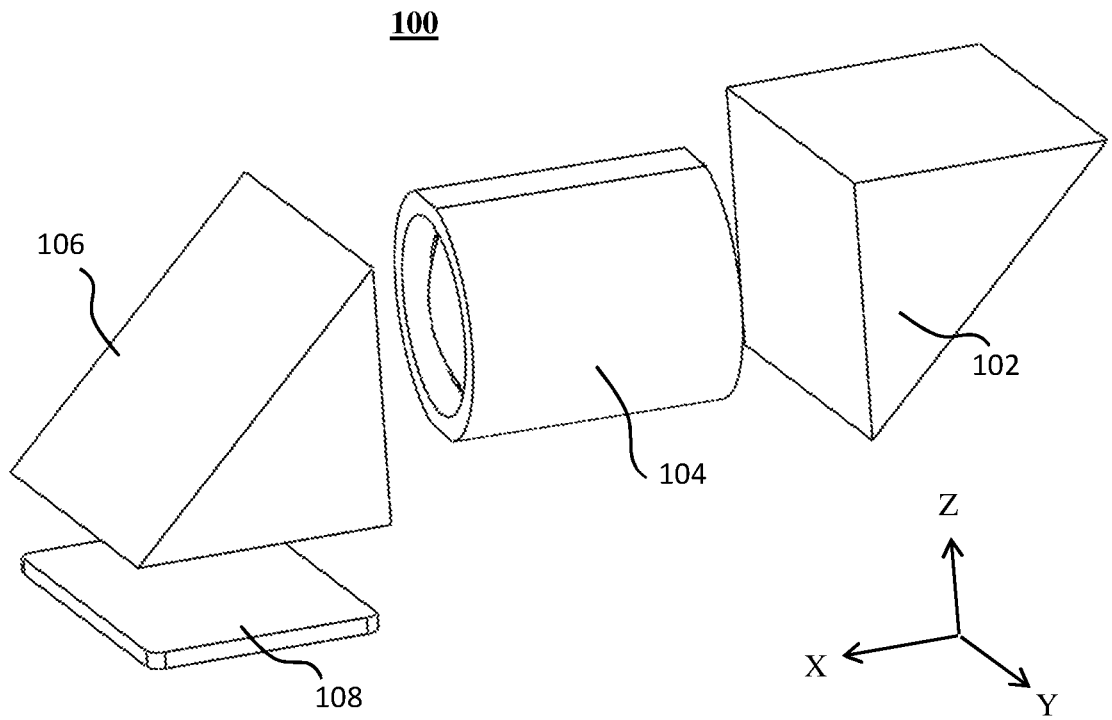
FIG. 1A shows schematically a double-folded camera (DFC) in a general perspective view, according to an example of the presently disclosed subject matter.
Figure 1B:
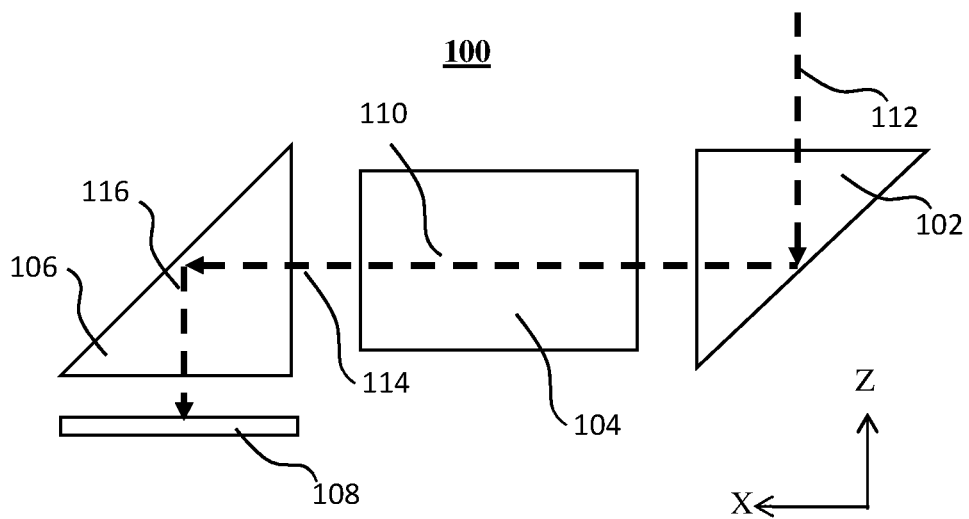
FIG. 1B shows the DFC of FIG. 1A from a side view.
Figure 1C:
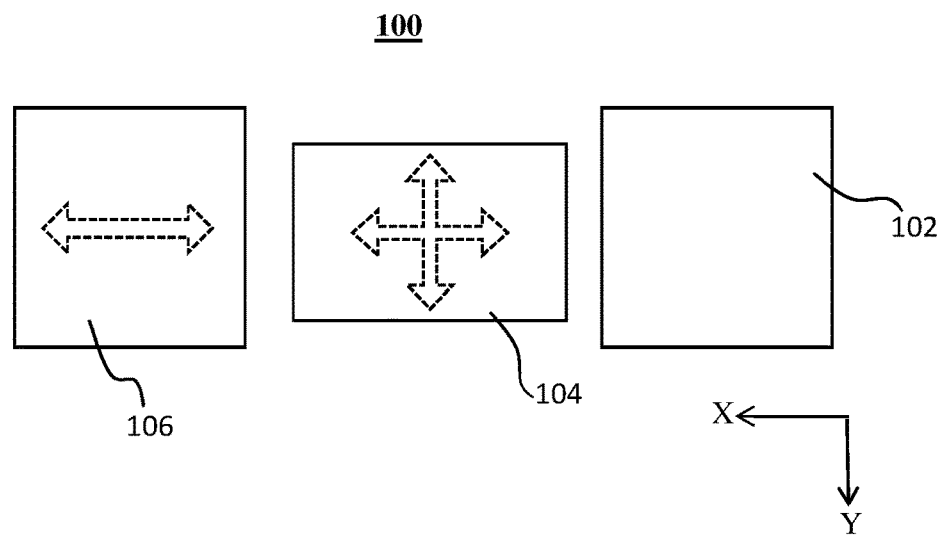
FIG. 1C shows the DFC of FIG. 1A from a top view.

FIGS. 1A, 1B and 1C show respectively schematic perspective, side and top views of a DFC numbered 100 according to an example of the presently disclosed subject matter. An orthogonal X-Y-Z coordinate ("axis") system shown applies also to all following drawings. This coordinate system is exemplary. DFC 100 includes a first OPFE 102 (here and exemplarily a prism), a lens 104, a second OPFE (here and exemplarily also a prism) 106 and an image sensor 108. In other embodiments, OPFEs 102 and 106 may be mirrors. Lens 104 has a lens optical axis 110. Lens 104 is characterized by a fixed effective focal length (EFL), as known in the art. EFL is measured in length units (micrometer (µm), millimeter (mm), or meter (m)). Optical axis 110 may also be referred to herein as "folded camera optical axis". Light arriving from an object (not shown) in a first optical path 112 is folded by first OPFE 102 to a second optical path 114 substantially aligned with optical axis 110, passes through lens 104, is folded again by second OPFE 106 to a third optical path 116, and impinges on sensor 108 to form an image. All optical paths are marked in FIG. 1B.

Figure 4:
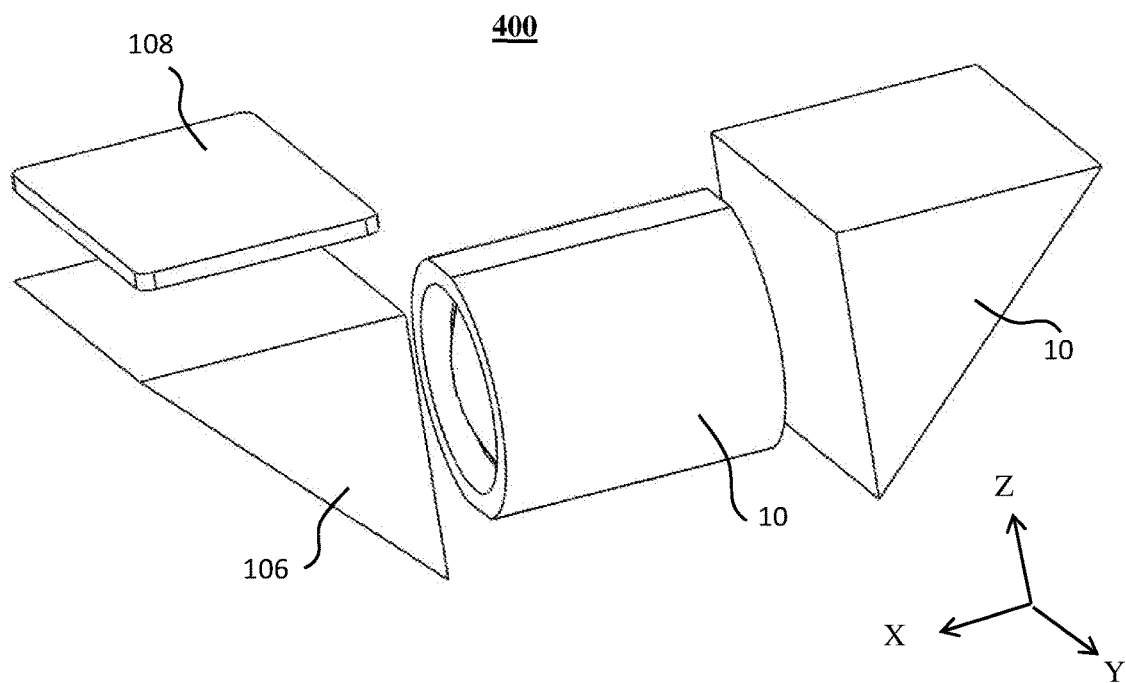
FIG. 4 shows schematically another DFC design in a general perspective view, according to an example of the presently disclosed subject matter.

In DFC 100, second OPFE 106 folds the optical path to a direction away from the object side (negative Z direction in the coordinate system given), with image sensor 108 being in the negative Z direction relative to OPFE 106. However, this is not mandatory, and the folding by OPFE 106 can be done in the opposite direction (closer to the object side). This configuration is presented in FIG. 4, showing a DFC 400 having all the elements with the same numbering and functionality as DFC 100, except that image sensor 108 is in the positive Z direction relative to OPFE 106. All the analysis above and below applies for such a case. The first and third optical paths (112 and 116) are substantially parallel. Second optical path 114 is orthogonal to the first and third optical paths (112 and 116). In the XYZ coordinate system used in all figures, the first and third optical paths (112 and 116) lie along the Z axis, while second optical path 114 lies along the X axis. The Y axis is perpendicular to the first, second and third optical paths. DFC 100 can thus capture images on image sensor 108 from objects that lie generally in planes substantially orthogonal to the first optical path. Image sensor 108 outputs an output image. The output image may be processed by an image signal processor (ISP—not shown) for demosaicing, white balance, lens shading correction, bad pixel correction and other processes known in the art of ISP design.

In DFC 100, several elements may be actuated (i.e. moved or shifted linearly). Actuation directions for lens 104 and second OPFE 106 are marked by dashed arrows in FIG. 1C (as well as in FIGS. 2C and 3C). Lens 104 may be actuated in plane XY. Shifting lens 104 in the X direction (along lens optical axis 110) may change the focus position of the system. Shifting lens 104 in the Y direction (a direction orthogonal to both lens optical axis 110 and first optical path 112) shifts the image on image sensor 108 in the Y direction. Shifting the image on the image sensor in the Y direction may be used to create OIS, which corrects for tilt of DFC 100 around the X axis (also referred to as "correction of a first tilt" of the DFC). Second OPFE 106 may be also actuated in the X direction. Shifting second OPFE 106 in the X direction creates two effects simultaneously: the first effect is to change the focus plane of the system (i.e. change the distance from the camera of a plane which is focused on the image sensor); the second effect is to shift the image on the sensor in the X direction. Shifting the image on the image sensor in the X direction may be used to create OIS to correct tilt of DFC 100 around the Y axis also referred to as "correction of a second tilt" of the DFC). In total, the actuation and movements described above provide 3 degrees of freedom (DOF) (shifting the lens in the X direction, shifting the lens in the Y direction, and shifting the second OPFE in the X direction) which may be used for three optical effects: focusing and OIS in two directions, as indicated in Table 1. To clarify, α and β in Table 1 are respectively the "first tilt" and the "second tilt" of the camera. Therefore, the three optical effects can be achieved as a linear sum of 3-movement DOF (i.e. movement in 3 DOFs) described herein.

TABLE 1

| Desired optical effect | Actuation |
| --- | --- |
| Focus shift, A µm | Lens 104 shift X direction, A µm |
| Correction of a first tilt, α radians | Lens 104 shift Y direction, EFL × tan(α) |
| Correction of a second tilt, β radians | OPFE 106 shift X direction, EFL × tan(β) + Lens 104 shift X direction, EFL × tan(β) |

Actuation methods for actuating a lens in two directions (i.e. X and Y in FIG. 1C) are known. Such actuation may be performed using voice coil motors (VCMs), as described for example in co-owned international patent applications PCT/IB2016/052143, PCT/IB2016/052179 and PCT/IB2017/054088. Actuation of any optical element in one direction is also known, for example as described in U.S. Pat. No. 8,810,714. Other actuation methods may include use of stepper motors, shape memory alloy motors, piezo electric motors, micro-electro-mechanical system (MEMS) motors, etc.

Figure 2A:
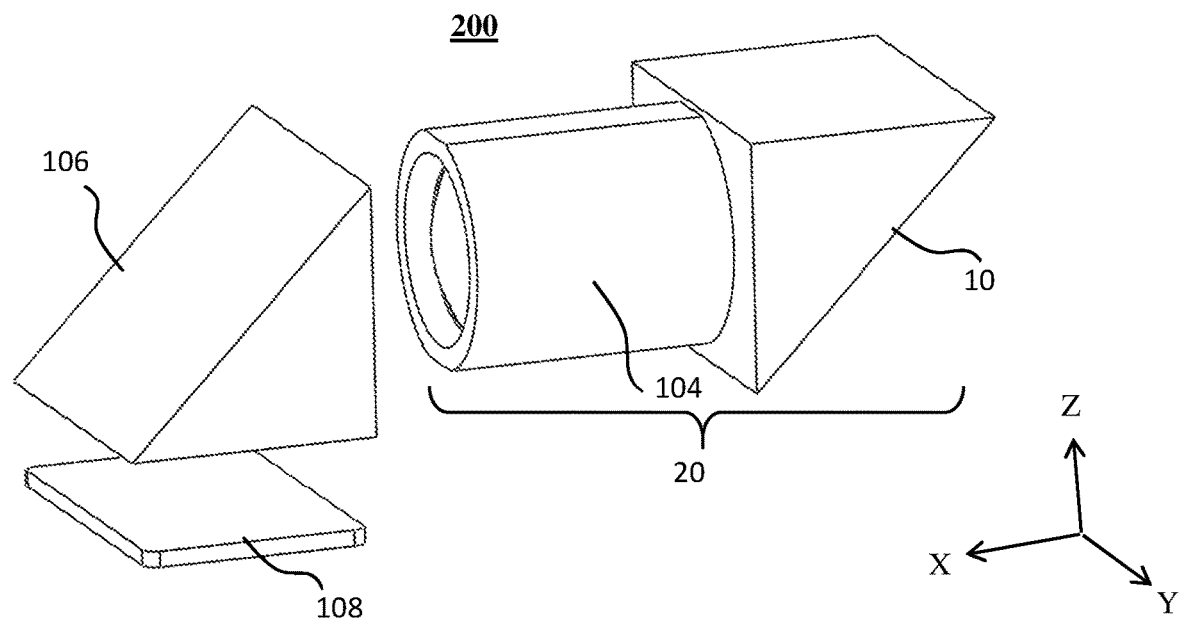
FIG. 2A shows schematically a double-folded camera (DFC) in a general perspective view, according to another example of the presently disclosed subject matter.
Figure 2B:
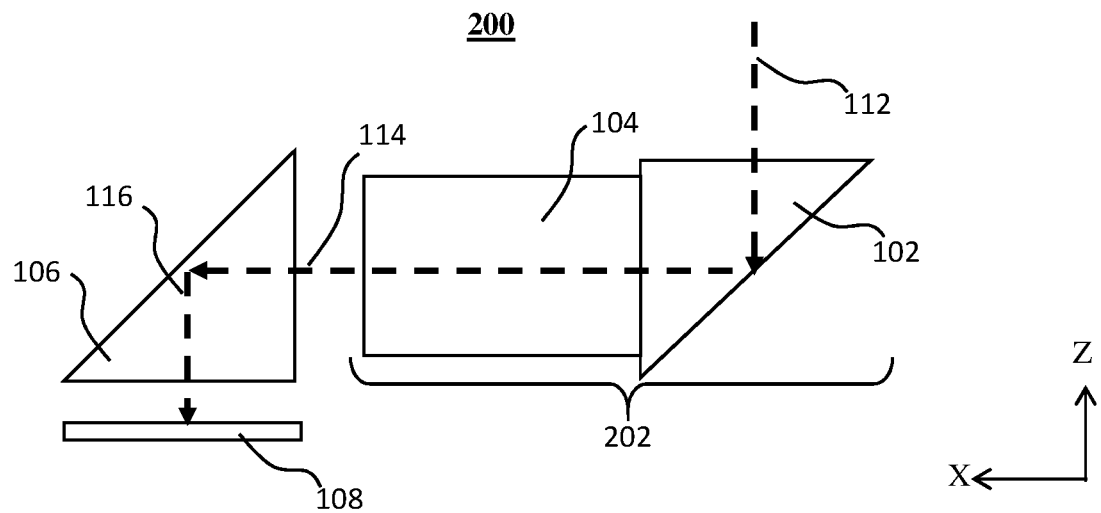
FIG. 2B shows the DFC of FIG. 2A from a side view.
Figure 2C:
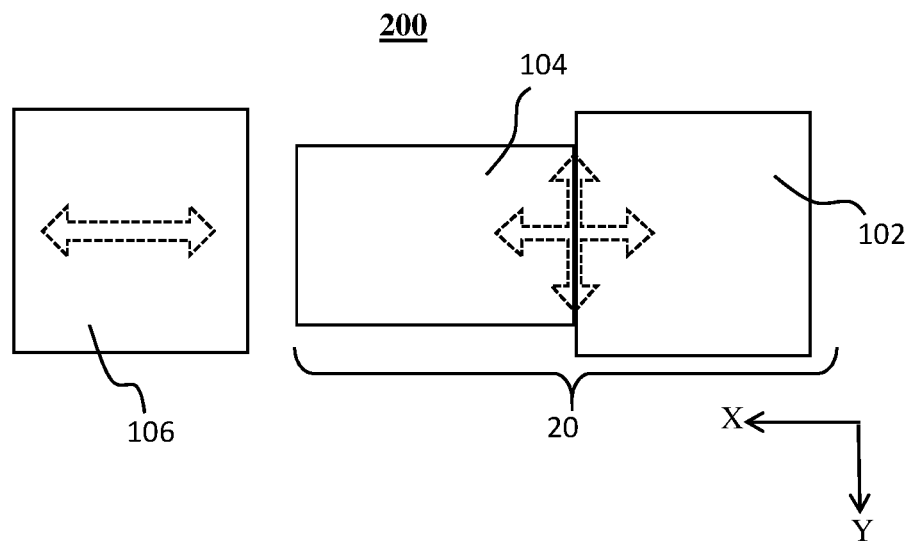
FIG. 2C shows the DFC of FIG. 2A from a top view.

FIGS. 2A, 2B and 2C show respectively schematic perspective, side and top views of a DFC numbered 200 according to another example of the presently disclosed subject matter. DFC 200 includes the same elements as DFC 100, numbered with the same numerals. In DFC 200, first OPFE 102 and lens 104 are made as one (integrated) part, i.e. form a lens-prism assembly 202. Lens-prism assembly 202 may be actuated like lens 104 in DFC 100 i.e. in plane X-Y along X direction and/or along Y direction. The actuation of lens-prism assembly 202 in plane X-Y has to a good approximation (less than 1-5 percent of the effect) the same optical effect as that of the actuation of lens 104 in plane X-Y in camera 100. In DFC 200, second OPFE 106 may be shifted in the same direction and with the same optical effects as in DFC 100. Therefore, in system 200, the three optical effects can also be achieved as a linear sum of 3-movement DOF described herein.

Figure 3A:
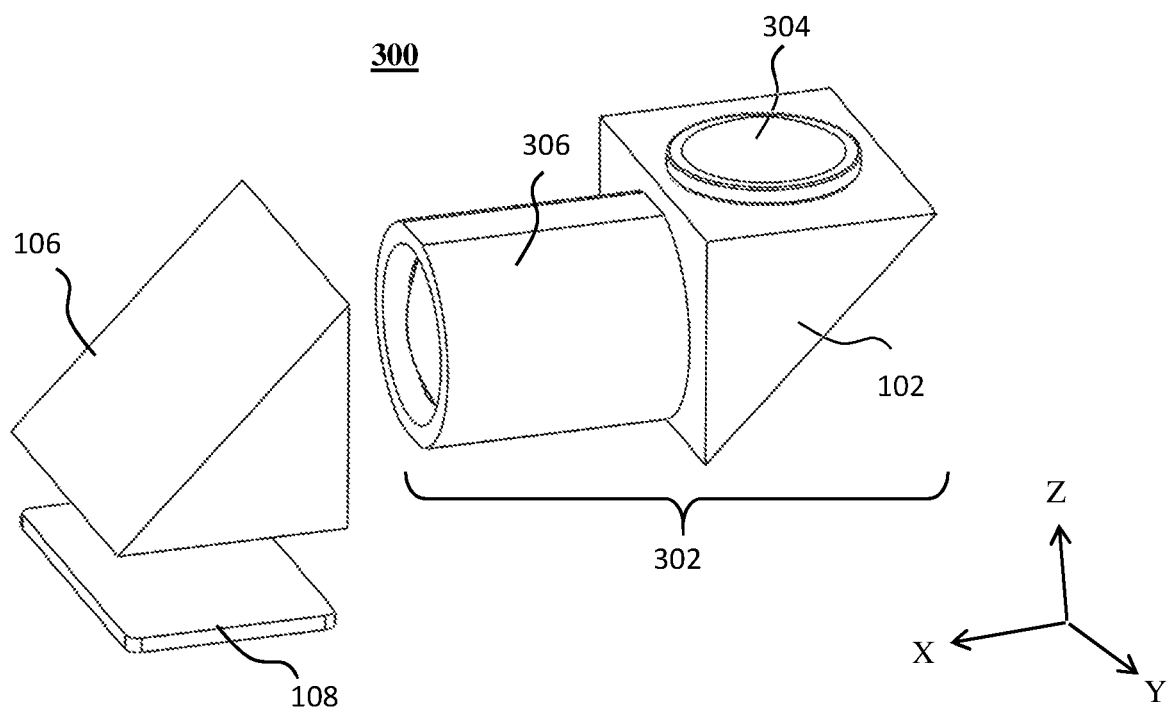
FIG. 3A shows schematically a double-folded camera (DFC) in a general perspective view, according to yet another example of the presently disclosed subject matter.
Figure 3B:
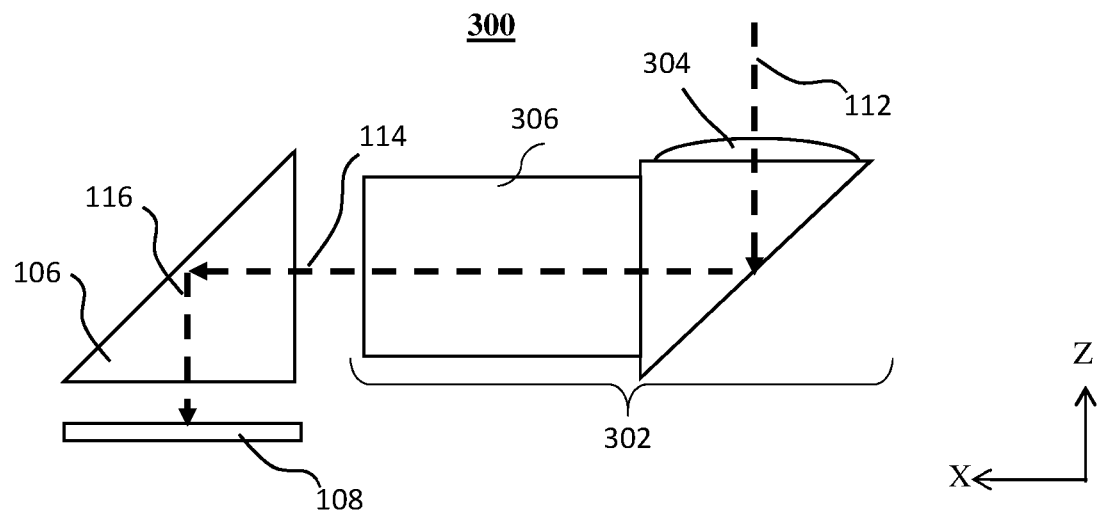
FIG. 3B shows the DFC of FIG. 3A from a side view.
Figure 3C:
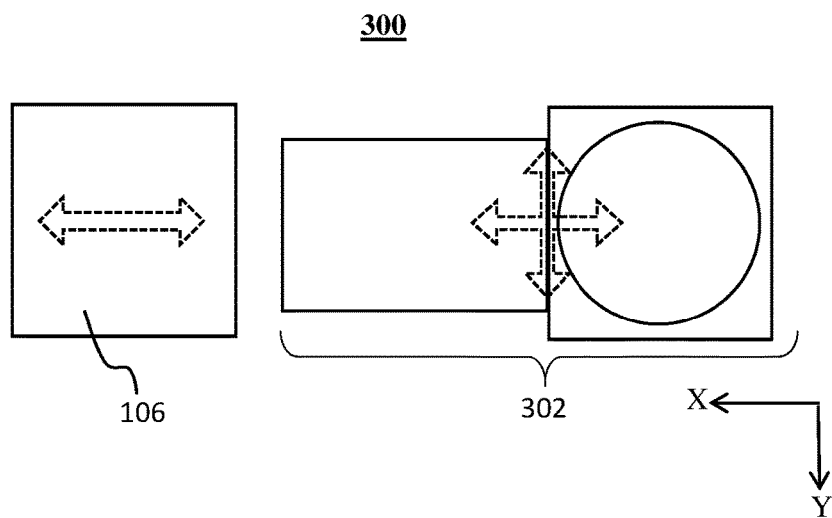
FIG. 3C shows the DFC of FIG. 3A from a top view.

FIGS. 3A, 3B and 3C show respectively schematic perspective, side and top views of a DFC numbered 300 according to yet another example of the presently disclosed subject matter. DFC 300 is similar to DFC 200, except that lens-prism assembly 202 is replaced by a folded lens 302. Folded lens 302 is a distributed (split) folded lens in the sense defined above: it includes a plurality of lens elements and the first OPFE, wherein some of the lens elements (for example, one lens element 304) are positioned before the OPFE in first optical path 112, while one or more other lens elements are positioned after the OPFE in second optical path 114, being for example included in a barrel 306. An example of design of folded lens 302 may be seen in co-owned U.S. patent application Ser. No. 16/310,690. Folded lens 302 serves with the same optical properties of lens-prism assembly 202. Folded lens 302 may be actuated like lens 104 in DFC 100 and lens-prism assembly 202 in DFC 200, i.e. in plane X-Y along X direction and/or along Y direction. The actuation of folded lens 302 in plane X-Y has the same optical effect as the actuation of lens-prism assembly 202 in plane X-Y in DFC lens-prism assembly 202. In DFC 300, second OPFE 106 may be shifted with the same direction and same optical effects as in DFC 100. Therefore, in system 300, the three optical effects can also be achieved as a linear sum of 3-movement DOF described herein.

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

All references mentioned in this specification are herein incorporated in their entirety by reference into the specification, to the same extent as if each individual reference was specifically and individually indicated to be incorporated herein by reference. In addition, citation or identification of any reference in this application shall not be construed as an admission that such reference is available as prior art to the present invention.

What is claimed is:

1. A method, comprising:
   a) providing a folded camera having a single lens module having a single lens module optical axis and a fixed effective focal length (EFL), an image sensor, a first optical path folding element (OPFE) for folding light arriving from an object in a first optical path to a second optical path substantially aligned with the lens optical axis, and a second OPFE for folding light from the second optical path to a third optical path toward the image sensor, wherein the third optical path is substantially parallel with the first optical path and wherein the first and third optical paths are substantially orthogonal to the second optical path;
   b) moving the single lens module including all lens elements therein as a single integrated unit in a first direction substantially parallel to the single lens module optical axis and in a second direction substantially perpendicular to both the first and second optical paths; and
   c) moving the second OPFE in the first direction, wherein the combined motion of the single lens module and of the second OPFE is operative to provide focus and to compensate for tilts of the camera around the first and second directions.

2. The method of claim 1, wherein the single lens module is fixedly attached to the first OPFE to form a lens-OPFE assembly and wherein moving the single lens module includes moving the lens-OPFE assembly.

3. A method for providing focus and optical image stabilization in a folded camera module having a first optical path folding element (OPFE) for folding light from a first optical path with a first optical axis to a second optical path with a second optical axis perpendicular to the first optical axis, a single lens module with a symmetry axis parallel to the second optical axis and with a fixed effective focal length (EFL), and a second OPFE for folding light from the second optical path to a third optical path, the method comprising:
   a) moving the single lens module including all lens elements therein as a single integrated unit in a first direction substantially parallel to the symmetry axis and in a second direction substantially perpendicular to both the first and second optical paths; and
   b) moving the second OPFE in the first direction, wherein the combined motion of the single lens module and of the second OPFE is operative to provide focus and to compensate for tilts of the camera around the first and second directions.

* * * * *